United States Patent [19]

Freeston

[11] Patent Number: 5,701,467
[45] Date of Patent: Dec. 23, 1997

[54] COMPUTER DATA STORAGE MANAGEMENT SYSTEM AND METHODS OF INDEXING A DATASPACE AND SEARCHING A COMPUTER MEMORY

[75] Inventor: Michael William Freeston, Munich, Germany

[73] Assignee: European Computer-Industry Research Centre GmbH, Munich, Germany

[21] Appl. No.: 583,072
[22] PCT Filed: Jul. 1, 1994
[86] PCT No.: PCT/EP94/02166
§ 371 Date: May 20, 1996
§ 102(e) Date: May 20, 1996
[87] PCT Pub. No.: WO95/02222
PCT Pub. Date: Jan. 19, 1995

[30] Foreign Application Priority Data

Jul. 7, 1993 [EP] European Pat. Off. .............. 93110856

[51] Int. Cl.$^6$ .................................................. G06F 17/30
[52] U.S. Cl. ......................... 395/611; 395/601; 395/612
[58] Field of Search ................................... 395/611, 612, 395/601

[56] References Cited

U.S. PATENT DOCUMENTS

| | | | |
|---|---|---|---|
| 5,119,490 | 6/1992 | Kurose | 395/600 |
| 5,247,666 | 9/1993 | Buckwold | 395/600 |
| 5,307,486 | 4/1994 | Nakamigawa | 395/600 |

*Primary Examiner*—Thomas G. Black
*Assistant Examiner*—Donald Min
*Attorney, Agent, or Firm*—Lee, Mann, Smith, McWilliams, Sweeney, & Ohlson

[57] ABSTRACT

A computer data storage management system includes a memory employing a hierarchical data structure comprising a plurality of nodes (root, branch and leaf), in particular a multi-dimensional information database. The branch nodes are index nodes and the leaf nodes are data nodes. The index nodes are arranged in an index tree structure. When extra information inserted into the memory results in index node overflow, the index node is split and, in certain specified circumstances, an index entry will become disposed at an index tree level higher than the hierarchical level to which it corresponds, i.e. is promoted. Whilst this makes the index tree unbalanced, it facilitates the addition of information to and the searching of such a database.

3 Claims, 9 Drawing Sheets

☐ Logical region $L_a$

— External boundary of Logical region $L_a$

— Internal boundary of Logical region $L_a$

COMPUTER DATA STORAGE MANAGEMENT SYSTEM AND METHODS OF INDEXING A DATASPACE AND SEARCHING A COMPUTER MEMORY

TECHNICAL FIELD

This invention relates to database structures and in particular to hierarchical index structures for use therein, methods for use in indexing a dataspace and methods of searching database structures. The invention also relates to the electronic storage of an n-dimensional entity in the form of an n-dimensional data space in a one-dimensional memory of a computer, and/or the transfer and/retrieval of said n-dimensional entity to or from the memory of the computer.

BACKGROUND ART

Spatial information can be stored in the memory of a computer. Spatial information consists essentially of points in an n-dimensional data space. For example, the points may be coordinates of the centres of objects on a map, in two dimensions, or the locations of aircraft in three-dimensional air-space. Associated with this positional information may be additional information describing the object at the location—such as the type of a map object, or the call-sign and velocity of an aircraft.

Classically, data structures in database systems have been restricted to fixed-structure records or tuples. The structure of a tuple is a set of fields, or attributes. The types of the attributes have been restricted to a few simple types, such as real, integer, and string.

In order to build an index to a set of records, it is assumed that all the members of the set have the same structure. A key value must be associated with each. This value may or may not be unique to the record. In principle, it may be the direct value of a single attribute, or of several attributes, or it may be generated by some conversion operation on one or more attributes. The unit of memory allocation for the data and the index, in main memory or secondary storage, is a page, and this page is almost invariably of fixed size.

The invention is concerned with a hierarchical index, which takes the form of a tree structure. In general, a tree structure is composed of a root node, branch nodes and leaf nodes. By convention, the tree is represented in inverted form i.e. with the root at the top. A traversal path through the tree is defined by the sequence of nodes encountered along the path. The height of the tree is the length of the longest direct path traversed from root to leaf. The fan-out ratio is the number of branches leading from a node in the direction of the leaves. This ratio usually has a range of allowed values, depending on the details of the design and implementation. The limits of this range are the same for all the index nodes.

The best known and most widely used hierarchical structure for dynamically indexing a set of records in a database is the B-tree. The B-tree takes the value of a single attribute in a record, or the lexical concatenation of several attributes, as the index key. Each index node corresponds to a page of memory, and contains an ordered set of index keys. The index is constructed as a hierarchy of index keys: at any particular level of the tree, each node contains an ordered set of key values and, associated with each key, a pointer to a node at the index level below. Each key represents an upper (or lower) bound to the key values stored in the node to which it points. At the lowest index level, the keys point to data pages containing records within the ranges defined by the lowest level index keys.

When the insertion of an additional record causes a data page to overflow:

1. the page is split into two pages about the median value of the index key attribute(s).
2. a copy of the median key attribute value, together with an additional pointer for the new page, is inserted in the index leaf node which holds the pointer to the original page. An index node thus consists of [key, pointer] pairs, stored in key value order. [Plus one additional pointer, for the extreme upper or lower range partition].

If an insertion in an index node causes it to overflow, then the index node is similarly split about its median key value, a copy of which is posted upwards, together with a pointer to the newly created index page.

In the worst case, a single insertion of a data record can trigger a chain of overflows and insertions up to and including the root of the index tree. When the root splits, a new root is generated and the height of the index tree increases by one. In this way a tree-structured index grows upwards (i.e. an inverted tree) as the number of data pages increases.

If all index pages are the same size, and the maximum number of key entries in each index page is F (the fan-out ratio), then each level of the index has maximally F times as many index pages as the level above, and there will be maximally F times as many data pages as pages in the lowest index level. Since both data and index pages are split at their median values, the worst-case occupancy is 50%, but the statistical average for the entire index is approximately 69%.

The B-tree structure has a number of attractive properties, which is why it has been almost universally adopted for dynamic indexing in database systems. In particular:

1. the tree is always perfectly balanced i.e. for a given size of tree, every direct path from root to leaf is the same length;
2. if the full key of any individual record is specified (an exact-match query), the record can always be accessed via a direct path from root to leaf. Thus the access time for a single record is constant and predictable, for a given tree size;
3. the length of the direct path from root to leaf increases only logarithmically in the total number of indexed records so that, typically, a five-level index is sufficient to index several Terabytes of data;
4. the maximum update time for the insertion or deletion of a single record is also logarithmic in the total number of indexed records;
5. there is a guaranteed minimum occupancy (50%) the data and index pages;
6. the maximum size of the index is always directly proportional to the quantity of the data;
7. all the above properties are preserved under deletion as well as insertion, i.e. the performance of the structure does not deteriorate with usage—it is fully dynamic.

For many years researchers have tried to find a structure which generalises the properties of the B-tree to n dimensions i.e. an index on n attributes of a record instead of one. Ideally, such an index should have the property that, if values are specified for m out of n key attributes (a partial match query), then the time taken to find all the records matching this combination should be the same, whichever combination of m from n is chosen.

To achieve this, the index must be symmetrical in n dimensions. There is no longer a directly defined ordering between the individuals records according to their (single key) attribute values. Each record must be viewed as a point in an n-dimensional data space, which is the Cartesian product of the domains of the n index attributes.

An n-dimensional generalisation of the B-tree must partition this data space into sub-spaces or regions in such a way that the properties of the B-tree as listed above are preserved. Specifically, each region corresponds to a data page, and the index represents a recursive partitioning of the data regions into higher level index regions.

In order to achieve symmetry in the n dimensions, in the sense defined above, the following additional property is needed:

8. the number of recursive partitions of the data space required to define the boundaries of each data region should be (as nearly as possible) the same in each dimension.

It is further important to the efficiency of the index that the following properties are maintained:

9. the spatial distribution of the data regions should correspond as closely as possible to the spatial distribution of the data points;
10. the spatial distribution of the index regions at each level of the index tree should correspond as closely as possible to the spatial distribution at the next lower level, and to that of the data regions;
11. the representation of empty space should be minimised.

Unfortunately, it has proved extremely difficult to reconcile all these requirements. Considerable progress has been made, as apparent from the substantial number of proposals put forward over the last few years, but there remains an underlying inflexibility in current designs, and prior to this invention there was no solution which was provably resistant to pathological cases.

One of the previous proposals is a multi-dimensional file structure known as the BANG file (Balanced And Nested Grid file). See for example "The BANG file: a new kind of grid file" M. W. Freeston. Proc. ACM SIGMOD Conf. San Francisco, June 1987, or "Advances in the design of the BANG file" M. W. Freeston, Third International Conference on Foundations of Data Organisation and Algorithms, Paris, June 1989. The BANG file has a tree-structured directory which has the self-balancing property of a B-tree and which allows data space and index regions to be nested, one inside the other. The BANG file adapts well to non-uniform data distributions but it cannot maintain guaranteed performance characteristics in all cases.

The problem is how to allocate the tuples represented by the points in an n-dimensional data space to a set of data blocks (or pages) in a file. In geometric terms the obvious thing to do is to divide up the data space into a set of hyperrectangles or block regions, each of which corresponds to a disk page. However, in order to maximise the storage efficiency of the file, the number of such regions and the positions of their boundaries, have to be arranged so that each corresponding disk page has a high data occupancy.

In the BANG file, data pages are accessed via a multi-level directory of block regions, stored in the same file as the data. When the insertion of a tuple into the file causes a disk block to overflow, then the disk page and the corresponding region are split into two and the directory is updated. The partitioning strategy is required to obtain a "best balance", i.e. nearest possible balance, between the occupancies of the two resulting regions. The BANG file partitions the data space by a sequence of binary divisions in which the dimension selected for the next division is chosen according to a pre-defined order of cycling through all the dimensions. Whilst the same partitioning sequence is applied throughout the data space, the partitioning operation is applied selectively to individual block regions. The partitions can, in principle, be any shape within the restrictions of the following axioms:

Axiom 1: no partition boundary may intersect itself;
Axiom 2: no two partition boundaries may intersect.

In particular, one partition can enclose another i.e. they can be "nested".

It is an object of the present invention to provide a database structure, in particular a hierarchical index structure for use therein, which enables n-dimensional information to be mapped into the one-dimensional memory of a computer (i.e. a memory consisting of a linear sequence of pages) and conversely which enables efficient retrieval of information from the memory relating to a specified point in the n-dimensional data space.

DISCLOSURE OF THE INVENTION

According to one aspect of the present invention there is provided a computer data storage management system including a memory employing a hierarchical data structure representing the recursive partitioning of a data space into contiguous or disjoint subspaces, and such that the external boundary of any subspace does not intersect the external or internal boundary of any other subspace at the same or any other level of recursive partitioning but may enclose, or partially coincide with, the external boundary of said other subspace, the data structure hierarchy comprising a plurality of nodes including a root node, a plurality of branch nodes and a plurality of leaf nodes;

characterised in that:
  each node in the data structure hierarchy represents a subspace at a respective or lower level in the corresponding recursive partition hierarchy;
  the root node represents the entire data space;
  each lower level node represents a subspace of the space represented by a respective parent node, or a subspace of the space represented by a descendant of the respective parent node, each lower level node comprising a child node;
  an unpromoted node is a node which is at the same level in the data structure hierarchy as the level of the subspace which it represents in the corresponding recursive partition hierarchy, and a promoted node is a node which is at a higher level in the data structure hierarchy than the level of the subspace which it represents in the corresponding recursive partition hierarchy, promotion occurring as a result of node overflows due to the introduction of extra information into the memory;
  the subspace represented by any child node promoted to a respective node is a subspace of the union of all of the subspaces represented by unpromoted children of the respective node;
  the branch nodes in the hierarchical data structure are index nodes and the leaf nodes are data nodes;
  each data node contains either a set of data entries or a set of pointers which reference data entries stored elsewhere; each data entry contains a value or set of values which directly or indirectly specify the coordinates of a point representing that data entry in the data space;
  each index node contains a set of index entries;
  each index entry corresponds uniquely to one of the children of the index node which contains the index entry, each index entry being associated with:
    (i) a respective pointer which refers to the logical address of the child node corresponding to the index entry;
    (ii) an indication of the level, in the hierarchy of recursive partitions of the data space, of the subspace represented by the entry, and (iii) a value or a set of values which directly or indirectly defines the external boundary of the subspace represented by the index entry;

and in that the internal boundary of the subspace represented by an index entry is defined implicitly by the presence in the index of one or more other index entries which belong to the same or higher recursive partitioning level and each of which represents a subspace which the external boundary of the subspace represented by the said index entry directly encloses;

the external boundary of a first subspace directly enclosing the external boundary of a second subspace if, at the same recursive partition level, there exists no third subspace whose external boundary is enclosed by the external boundary of the said first subspace and whose external boundary encloses the external boundary of the said second subspace.

According to another aspect of the present invention there is provided a computer implemented method for use in indexing a data space, the data space comprising a database for multi-dimensional information, the indexing having a hierarchical structure and the dataspace being recursively partitioned into subspaces with the corresponding index entry nodes arranged in an index tree, characterised in that:

upon the introduction of extra information causing an index entry node to overflow, the said index entry node is split into two resulting index nodes by partitioning the space which the said index node represents into two subspaces, said partitioning either being such that the number of index entries in the two resulting index nodes is as near equal as possible, or being in accordance with a predetermined criterion of balance in the distribution of the index entries between the two resulting index nodes;

the two resulting index nodes are disposed at the same level of the index tree as the index node from which they were created, and each resulting index node has as parent the parent of the said index node from which it was created; and in that if the external boundary of one of the two subspaces represented by the resulting index nodes is enclosed by the external boundary of the other of the two subspaces, and if no index entry in the said index node represents a subspace whose external boundary coincides with the said enclosed external boundary but there exists in the said index node an unpromoted or promoted index entry which represents a subspace whose external boundary directly encloses the said enclosed external boundary, then said unpromoted or promoted index entry is promoted to the parent of the said index node; an unpromoted index entry being an index entry which is at the same level in the hierarchical structure as the level to which it corresponds, a promoted index entry being an index entry which is at a higher level in the hierarchical structure then the level to which it corresponds, and the external boundary of a first subspace directly enclosing the external boundary of a second subspace if, at the same recursive partition level, there exists no third subspace whose external boundary is enclosed by the external boundary of said first subspace and whose external boundary encloses the external boundary of the second subspace.

According to a further aspect of the present invention there is provided a method of searching a computer memory having a hierarchical data structure which represents the recursive partitioning of a data space of a plurality of dimensions into contiguous or disjoint subspaces, and which is such that the external boundary of any subspace does not intersect the external or internal boundary of any other subspace at the same or any other level of recursive partitioning but may enclose, or partially coincide with, the external boundary of such other subspace, the data structure hierarchy comprising a plurality of nodes including a root node, a plurality of branch nodes and a plurality of leaf nodes in a tree structure;

each node in the data structure hierarchy representing a subspace at a respective or lower level in the corresponding recursive partition hierarchy;

the root node representing the entire data space;

each lower level node representing a subspace of the space represented by a respective parent node, or a subspace of the space represented by a descendant of the respective parent node, each lower level node comprising a child node; an unpromoted node being a node which is at the same level in the data structure hierarchy as the level of the subspace which it represents in the corresponding recursive partition hierarchy, and a promoted node being a node which is at a higher level in the data structure hierarchy than the level of the subspace which it represents in the recursive partition hierarchy, promotion occurring as a result of node overflows due to the introduction of extra information into the memory;

the subspace represented by any child node promoted to a respective node being a subspace of the union of all of the subspaces represented by unpromoted children of the respective node;

the branch nodes in the hierarchical data structure being index nodes and the leaf nodes being data nodes; each data node containing either a set of data entries or a set of pointers which reference data entries stored elsewhere; each data entry containing a value or set of values which directly or indirectly specify the coordinates of a point representing that data entry in the data space;

each index node containing a set of index entries;

each index entry corresponding uniquely to one of the children of the index node which contains the index entry, each index entry being associated with:

(i) a respective pointer which refers to the logical address of the child node corresponding to the index entry;

(ii) an indication of the level, in the hierarchy of recursive partitions of the data space, of the subspace represented by the entry, and (iii) a value or a set of values which directly or indirectly defines the external boundary of the subspace represented by the index entry;

and the internal boundary of the subspace represented by an index entry being defined implicitly by the presence in the index of one or more other index entries which belong to the same or higher recursive partitioning levels and each of which represents a subspace which the external boundary of the subspace represented by the said index entry directly encloses;

the external boundary of a first subspace directly enclosing the external boundary of a second subspace if, at the same recursive partition level, there exists no third subspace whose external boundary is enclosed by the external boundary of the said first subspace and whose external boundary encloses the external boundary of the said second subspace.

the method being characterised by searching iteratively the recursive partition hierarchy for the smallest subspace which encloses a point in the data space, such point representing the sought item of information;

said search being achieved by iteratively reconstituting the relevant nodes in the recursive partition hierarchy from the corresponding index hierarchy during the search;

starting at the root node of the index tree, the unpromoted index entries in the index node being searched for an unpromoted index entry which represents a subspace which directly encloses the point representing the sought item of information;

in the case of no such unpromoted index entry being found in the index node the search failing and terminating;

in the case of such an unpromoted index entry being found the promoted index entries in the index node being searched for those promoted index entries which respectively represent a subspace which directly encloses the point representing the sought item of information;

copy of each such promoted index entry directly enclosing the point representing the sought item of information being carried forward and demoted by one level and included for the purpose of the search only with the set of index entries in the next indexed node to be searched;

the next index node to be searched being that index node referenced by the pointer associated with the unpromoted index entry which represents a subspace which directly encloses the point representing the sought item of information;

the number of different index nodes visited along the search path for the item of information being sought being constant for a constant total number of items of information contained in the data space.

BRIEF DESCRIPTION OF THE DRAWINGS

Embodiments of the invention will now be described with reference to the accompanying drawings, in which.

MODES FOR CARRYING OUT THE INVENTION

The apparent intractability of the underlying problem, namely generalising the B-tree to n dimensions, is clearly related to the increased topological complexity of the n-dimensional case, and will be discussed in greater detail hereinafter.

Figure 1:
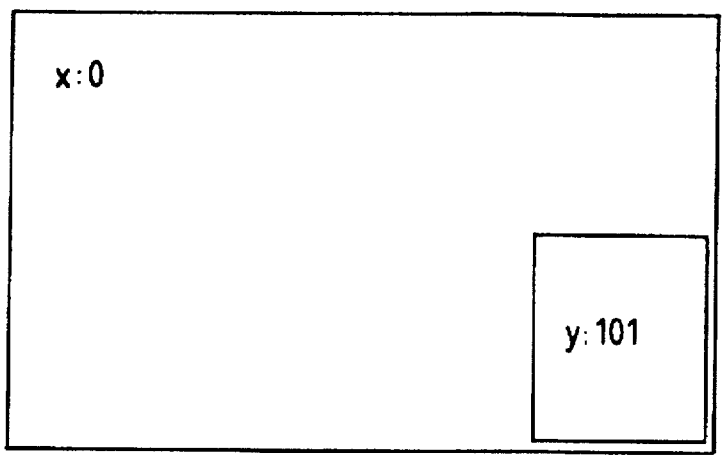
FIGS. 1 to 3 illustrated a very simple 2-level index.
Figure 2:
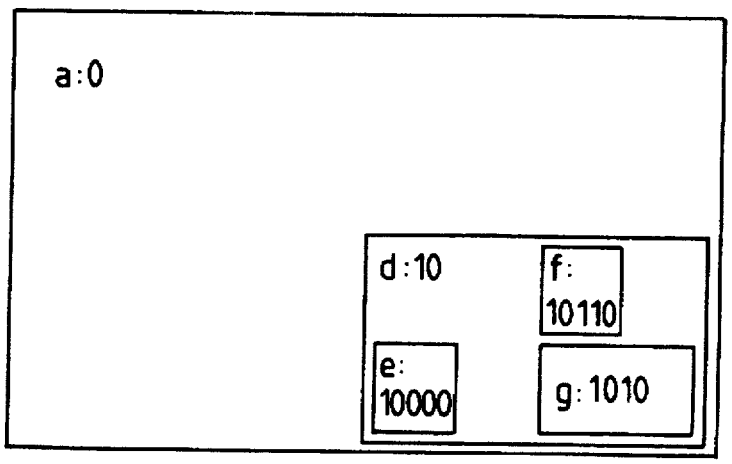
Figure 3:
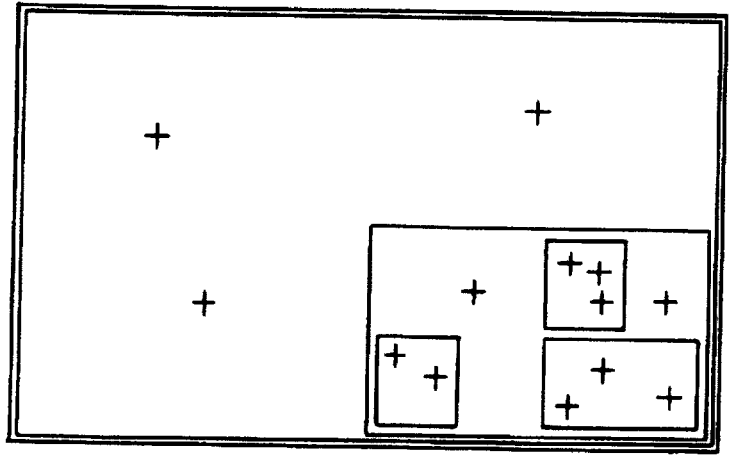

Reference will, however, first be made to FIGS. 1 to 3, which whilst giving an example of a very simple 2-level index according to the invention, also illustrates the problem in view of the way in which FIG. 2 is drawn. An n-dimensional data space is an n-dimensional space in which the domain of values of each coordinate corresponds to the domain of some data attribute. For example, in the case of an employee record: employee (id_number, age), this can be represented as a point in 2-dimensional space with coordinates representing id_number and age. The idea of any hierarchical index is to iteratively narrow down the search space within the whole data space. Each level of the index partitions the data space (or subspace of the data space) into smaller partitions. Whilst the subspaces can have any shape, in practice they should have simple shapes, such as rectangles, in order to be able to find a simple and compact representation for them.

In FIG. 1–3 the subspaces of a two-dimensional dataspace are generated by strict binary partitioning i.e. by repeatedly dividing the space exactly in half in alternate dimensions. If the left hand or lower half of a partition is represented by a zero, and the right hand or upper half by a 1, then every subspace can be identified by the sequence of 0's and 1's corresponding to the partition sequence which generated it. Subspace f, for example, has the unique representation 10110.

For clarity it assumed that the coordinates of only three points can be stored in each memory page. Thus, for the data distribution shown in FIG. 3, the dataspace must partitioned, as show in FIG. 2, into five subspaces, since each subspace corresponds to a memory page. If we also assume that an index page cannot store the representation of more than four subspaces in this case, then a two-level index is needed. The dataspace partitioning corresponding to the upper level index page (root node of the hierarchy) is shown in FIG. 1. This page partitions the dataspace into two sets of two partitions at the lower index level. FIG. 2 shows all the partitions together at the lower level. FIG. 2 should actually be drawn as two separate diagrams representing two separate nodes of the index: one containing a and e, and the other containing f and g. This highlights the problem. Which one of the two should d go in? It is partly in both. In the BANG file, the partition d had to be split into two parts along the boundary of partition y. All other previously proposed designs have done something similar.

The trouble with splitting partition d into two parts is that the whole principle of "balanced" partitioning is lost. As discussed above, when a page representing a partition overflows, it must be divided into two so that both resulting partitions contain the same number of entries, as far as possible. In the worst case a ration of 1:2 can always be achieved, as described below. If this principle cannot be guaranteed under all circumstances, then it is possible to devise arrangements where most of the partitions contain no more than a single entry. The number of pages in the index then explodes and is no longer proportional to the number of entries in the index. Hence the principle is crucial for fully predictable performance.

In the example of FIG. 3, if d is "forced" to split along the boundary of y, then there is no guarantee that each of the resulting split partitions will contain at least one third of the entries, which is a requirement for a practical multidimensional arrangement.

The tree structure proposed herein and referred to as the BV-tree (from the German word "Begriffsverzeichnis" (concept index)) solves the problem simply by moving partition d one level up the index hierarchy, i.e. to the branch node below which d would have to be split otherwise.

Figure 4:
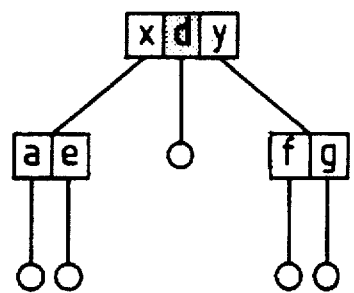
FIG. 4 illustrates the corresponding BV-tree.

FIG. 4 shows the conceptual structure of the corresponding BV-tree. Each of the labelled boxes corresponds to a memory page, and an index branch corresponds to the address of the page to which the branch points.

Note, however, a particular feature of the BV-tree: subspace d—which directly represents a subspace of the dataspace at the lower partition level—has nevertheless been promoted to the higher level in the index. The reasons for this are explained later.

Figure 5:
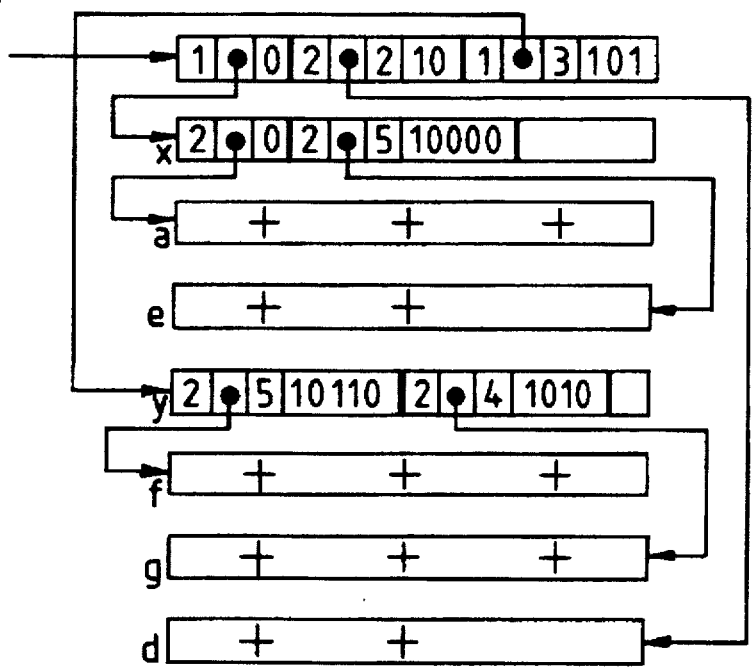
FIG. 5 illustrates the organisation and content of the corresponding memory pages.

FIG. 5 shows the actual organisation and content of the corresponding memory pages.

Figure 6A:
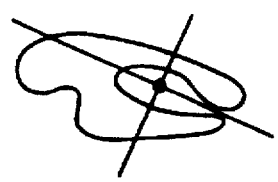
FIGS. 6–15 illustrate various definitions and axioms.
Figure 6B:
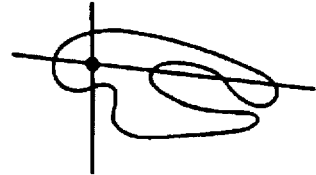

In order to define precisely what is meant by partitioning a dataspace into subspaces or regions it is necessary to make a number of definitions. Referring firstly to FIGS. 6a and 6b.

Definition 1.

A point X lies outside a closed boundary B in a dataspace D iff every straight line of infinite length which passes through X intersects B either zero or an even number of times on each side of X.

Definition 2.

A point X lies inside a closed boundary B in a dataspace D iff every straight line of infinite length which passes through X intersects B an odd number of times on each side of X.

Figure 7A:
Figure 7B:
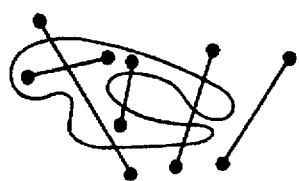

Referring next to FIGS. 7a and 7b.

Definition 3.

Two points X and Y lie on opposite sides of a closed boundary B iff a straight line joining X and Y intersects B an odd number of times.

Definition 4.

Two points X and Y lie on the same side of a closed boundary B iff a straight line joining X and Y intersects B either zero or an even number of times.

Figure 8A:
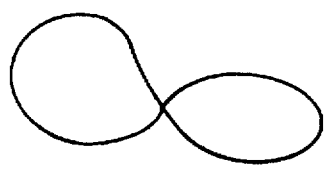
Figure 8B:
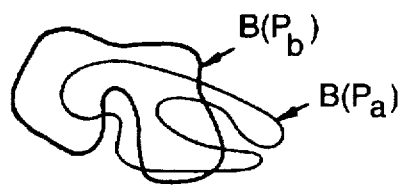

The axioms referred to above, are illustrated in FIGS. 8a and 8b.

Axiom 1. No boundary may intersect itself.
Axiom 2. No two boundaries may intersect.

Definition 5.

A closed boundary B encloses a subspace $D_s$ of a dataspace D iff every point X in $D_s$ lies inside boundary B.

Definition 6.

A closed boundary B exclusively encloses a subspace $D_s$ of a dataspace D iff B encloses $D_s$ and B enclosed no point which is not in $D_s$.

Definition 7.

A partition region P of a data space D is any subspace $D_s$ which is exclusively enclosed by a finite or infinite closed boundary B(P).

The data space D is itself a partition region, whose closed boundary B(D) is delineated by the finite or infinite upper and lower limits of its data domains or ranges.

Definition 8.

Figure 9:
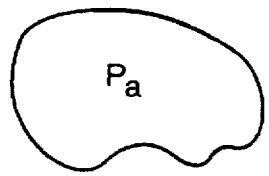
Figure 9:
Figure 9:
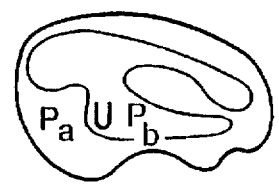

A partition region $P_a$ encloses a partition region $P_b$ iff every point in $P_b$ also lies within $P_a$. Thus: $P_a \cap P_b = P_b$ and $P_a \cup P_b = P_a$. (See FIG. 9).

Definition 9.

Figure 10:
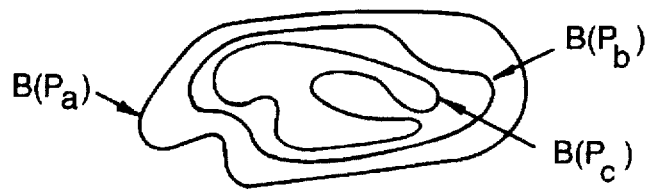

A partition region $P_a$ directly encloses a partition region $P_b$ iff $P_a$ encloses $P_b$ and there exists no other partition region $P_c$ which encloses $P_b$ and which is enclosed by $P_a$. (See FIG. 10).

Definition 10.

Figure 11A:
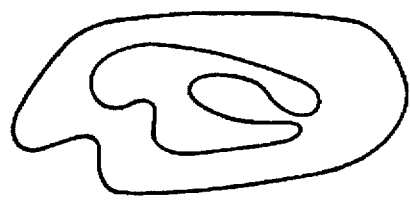

A partition region $P_a$ strictly encloses a partition region $P_b$ if $P_a$ enclosed $P_b$ and there exists no point which is common to the boundaries of both $P_a$ and $P_b$. (See FIG. 11a).

Definition 11.

Figure 11B:
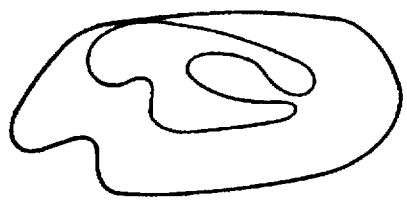

A partition region $P_a$ tangentially encloses a partition region $P_b$ if $P_a$ encloses $P_b$ but $P_a$ does not strictly enclose $P_b$ i.e. there exists at least one point which is common to $B(P_a)$ and $B(P_b)$. (See FIG. 11b).

It follows from axiom 2 that no two partition regions $P_a$ and $P_b$ may intersect, unless one encloses the other: $P_a \cap P_b \in \{\emptyset, P_a, P_b\}$.

Definition 12.

A logical region $L_a$ is the difference between a partition region $P_a$ is the difference regions $S=\{P_{b1}, P_{b2}, \ldots, P_{bn}\}$ which it directly encloses:

$$P_{bu} \cap P_{bv} = \phi \text{ for } u,v = 1, \ldots, n; u \neq v$$

$$P_a \cup P_{bu} = P_a \text{ for } u = 1 \ldots n$$

$$L_a = P_a - \cup_{u=1}^n P_{bu}$$

Figure 12:
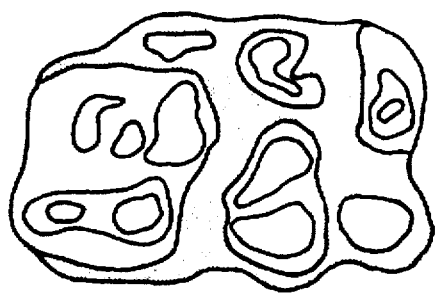
Figure 13A:
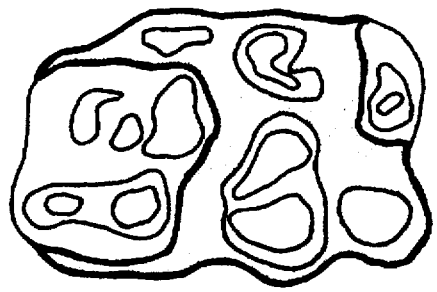
Figure 13B:
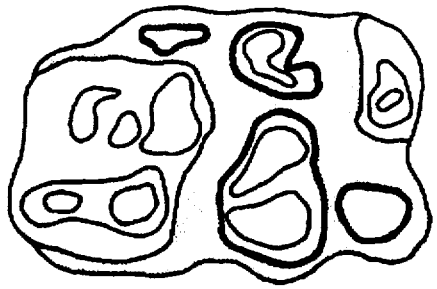

It follows from this definition that a logical region is composed of one or more disjoint sub regions, each of which may have one or more internal boundaries as well as an external boundary (see FIGS. 12, 13a and 13b):

Definition 13.

The external boundary $B_e(L_a)$ of a logical region $L_a$ is the set $S_B$ of boundaries which exclusively enclose the m disjoint sub regions $L_{au}$, u=1 ..., m which comprises $L_a$ i.e.:

$$L_a = \cup_{u=1}^m L_{au}; B_e = \qquad (1)$$

$$\{B(L_{a1}), B(L_{a2}), \ldots, B(L_{am})\}$$

Definition 14.

The internal boundary of a logical region $L_a$ is the set of boundaries of the union of the partition regions which $P_a$ directly and strictly encloses.

Note that, according to these definitions, a logical region always spans the space which it encloses i.e. no point which is enclosed by a logical region can at the same time be enclosed by another logical region. In contrast, a partition region does not, in general, span the space which it encloses. Note also that, given two partition regions $P_a$ and $P_b$ such that $P_a$ encloses $P_b$, it does not necessarily follow that logical region $L_a \equiv P_a - P_b$ will enclose $L_b \equiv P_b$.

Figure 14A:
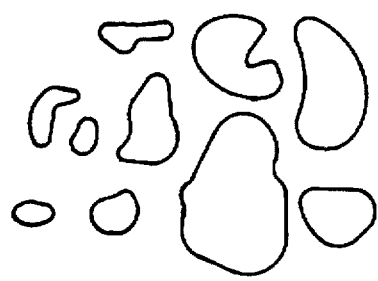
Figure 14B:
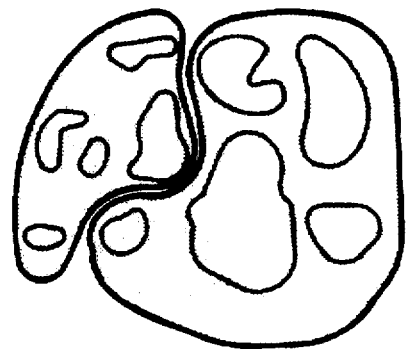

Now consider partitioning the partition regions. Referring to FIGS. 14a and 14b, suppose that a data space D is partitioned into a set of n partition regions Sp=$\{P_1, P_2, \ldots, P_n\}$ (FIG. 14a) according to the definitions and axioms above:

Suppose further that the set $S_p$ is itself to be partitioned into two sets $S_{pa}$ and $S_{pb}$, such that $S_{pa}$ and $S_{pb}$ are enclosed within partition regions $P_a$ and $P_b$ respectively i.e.:

$$P_a \cup P_b \subseteq D; S_{pa} \cup S_{pb} = S_{pa} S_{La} \cap S_{Lb} = \emptyset \qquad (2)$$

Figure 15A:
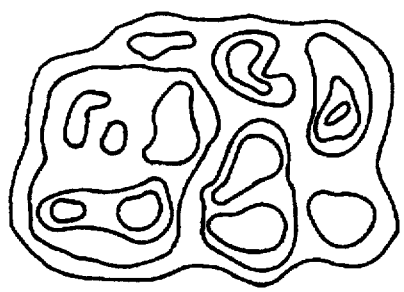
Figure 15B:
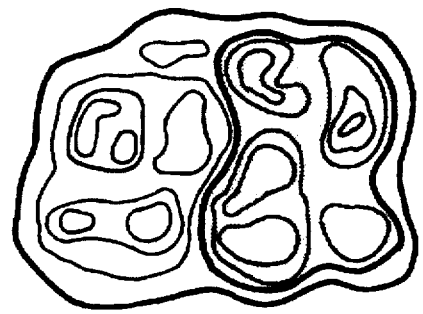

If all the partition regions are disjoint, then it is always possible to divide the set of partition regions into two halves i.e. to partition $S_p$ so that the cardinalities of $S_{pa}$ and $S_{pb}$ do not differ by more than 1 (FIG. 14b). If, however, some partition regions enclose others, then the situation is not so straightforward. Intuitively, one can see that, the more disjoint partition regions here are, the better the chance of achieving a 1:1 split. The worst case arises when there are no disjoint partition regions i.e. every partition region either encloses or is enclosed by another (FIG. 15a). Since, according to axiom 1, region boundaries may not intersect, the set $S_p$ must be partitioned into sets, one of which enclose the other (FIG. 15B) i.e.:

$$P_a \cup P_b = P_a; P_a \cap P_b = P_b; \qquad (3)$$

$$\forall P_i \in S_{pa}, \forall P_j \in S_{pb}, P_i \cup P_j = P_i$$

In this case, the algorithm for finding the best-balance partition proceeds as follows: suppose that, in general, La and $L_b$ contain fractions $f(L_a)$ and $f/(L_b)$ respectively of the total number of partition regions in the dataspace i.e. $f(L_a)+f(L_b)=1$. Initially, however $L_a$ encloses only the outermost member of $S_p$, with the remainder enclosed by $L_b$. If more than one member of this remainder enclosed by $L_b$ (i.e. $P_b$ directly encloses a number of disjoint partition regions), and if one of these enclosed members $P_i$ itself encloses more than half of the total membership of $S_p$, then the set $S_p$ is repositioned such $P_b$ is directly enclosed by $P_i$.

If none of the partition regions directly enclosed by $P_b$ enclose more than half of the total membership of $S_p$, then it may be possible to obtain a better balance between $L_a$ and $L_b$ by a further repositioning of $P_b$ which has the effect of transferring one or more members of the set from $L_b$ to $L_a$. The complexity of such a balancing algorithm is, however, exponential in the size of the set. But the partitioning ratio need never fall outside a worst-case ration of 2:1. The proof below also provides the framework of an algorithm to maintain this ratio:

Given that $f(L_a)<1/3$, then $f(L_b)>2/3$. Suppose now that $P_b$ is notionally replaced by two arbitrary partition regions $P'_b$ and $P''_b$. Then two distinct cases arise:

(a) $f(L'_b) \leq 2/3$ and $f(L''_b) \leq 2/3$ (b) $f(L'_b) > 2/3$ or $f(L''_b) > 2/3$ In both cases, $P_b$ is repositioned to coincide with whichever of the two (notional) partition regions $P'_b$ and $P'_b$ encloses the larger fraction. Since $f(L'_b)+f(L''_b)>2/3$, this larger fraction must be greater than $1/3$. Therefore, in case (a), $1/3<f(L_b) \leq 2/3$. In case (b), it remains true that $f(L_b)>2/3$. However, $P_b$ must still directly enclose more than one member of $S$, because no member which $P_b$ directly encloses can itself comprise a fraction greater than $1/2$. It is therefore possible to repeat the (notional) repartition operation on $P_b$ until case (a) becomes true—which it must eventually do, if only one member remains directly enclosed by $P_b$.

This is by no means a new result. It is emphasised here that it is a consequence of topology and it is quite independent of any particular data model. The proof may not be transparently clear that the result is almost intuitively obvious. This intuition relies on topological observations: a superimposed data model usually serves only to obscure.

Now consider partitioning logical regions. If a partition region $P_a$ encloses partition region $P_b$, and a further partition boundary is introduced between those of the other two, it has no effect on the extent of the dataspaces enclosed by $P_a$ and $P_b$, because partition regions are completely defined by their (external) boundaries.

In contrast, the logical region $L_a$ is changed, since it has an internal boundary which is defined by any partition boundaries which it directly encloses. ($L_b$ therefore remains unchanged). In general, if a new partition region $P_b$ is introduced directly inside $P_a$, then $L_a$ will be split into two logical regions $L'_a$ and $L_b$, where $L_a = L'_a \cup L_b$. The ultimate objective—the construction of an index—requires partitioning of a dataspace into a set of non-intersecting subspaces, each of which contains as nearly as possible an equal number of data points. It is therefore clear that, with the definitions given above, these subspaces must be logical regions, since logical regions do not intersect. Note, however, that logical regions are defined in terms of partition regions. It is therefore possible to represent the subspaces of a dataspace either directly, as logical regions, or indirectly as a set of partition regions: a data point which lies in a particular logical region also lies unambiguously in the partition region which directly encloses the point. Thus, in the latter case, a search for a target data point simply looks for the smallest partition region which encloses the point.

The problem of representing and indexing a set of objects with spatial extension has not been considered. However, a fundamental problem which this raises cannot be avoided when considering a hierarchy of subspaces, since the subspaces themselves have spatial extension.

Now consider the construction of a hierarchical index to the logical regions of the dataspace. Each branch and leaf node in the tree-structured index represents a logical region, and contains a representation of the set of logical regions which it encloses. Associated with each region is a pointer to an index node at the next level below in the tree structure. The branch nodes contain sets of regions. The pointer associated with a logical region in a leaf node points to a data node which contains a set of data points lying within that logical region of the data space. (If a partition region representation is chosen, then each pointer in the tree is associated with a partition region rather than a logical region, but the index nodes still represent logical regions). No other restrictions are imposed on the representation of the index, except that the number of entries in each tree rode and data node (the fan-out ratio) has a fixed upper limit F.

Thus, as with a B-tree, the search for a data point in the data space proceeds downwards from the root of the tree, searching at each index level for the logical region which encloses the point, and following the associated pointer down to the next level.

Also, as with a B-tree, the index grows upwards as the data nodes at the bottom of the index hierarchy overflow and split. Provided that all the data points are unique, a partition can always be found which divides an overflowing data node into two half-full nodes. When an index node overflows, it is always possible to partition the logical regions which it contains in a ration not worse than 1:2, as proved above. This last property is the general n-dimensional case, contrasting with the 1:1 splitting ratio achieved by the B-tree in the special, one-dimensional case.

However, a fundamental problem associated with the splitting of the index nodes has so far been ignored. Although the recursive partitioning procedure described above does not violate any of the axioms or definitions laid down earlier, it nevertheless introduces an ambiguity (the spanning problem) when interpreting a logical or partition region as a continuous subspace.

Suppose that logical region L is to be partitioned into two regions $L_a$ and $L_b$, such that $P_a \cup P_b = P_a$. If L corresponds to a data node, then the data points lying within $L_b$ can be transferred to new node representing $L_b$. But if L is a logical region at a higher index level, then it contains a set of logical regions $S_L$ of the next lower level. In this case, the boundary of $P_b$ cannot be located arbitrarily, since it may easily cross a boundary of one or more of the members of $S_L$, thereby violating the constraint that no two boundaries may intersect. Nevertheless it is known that it is always possible to find a position for the boundary of $P_b$ such that the sizes of $S_{La}$ and $S_{Lb}$ do not differ by a ratio great than 2:1.

But there is no guarantee that the boundary of $P_b$ will not be enclosed by one of the members $P_{ai}$, of $S_{pa}$. (For example, the boundaries of all the members of $S_p$ may be nested one within another). $P_{ai}$ must then itself be partitioned along the boundary of $P_b$. If $P_{ai}$ itself corresponds to an index node, then the same situation may be repeated at the next lower index level, and so on until a data node is reached—which can always be split without invoking any further chain reaction of partitioning.

Note that the partition boundary of the initially invoked partition of L is the boundary used for all subsequent partitions at the lower index levels i.e. only the position of the initial partition can be freely chosen to maintain the 2:1 partition ratio. It can be shown that the basic axioms will not be violated, that is the partition boundary will never intersect boundaries of regions at the lower index levels. But severe partitioning imbalances may occur at the lower levels. Worse, a lower level node split may trigger overflow in an index node above, which in turn may trigger a further cascade of downward splits.

This is a condition which haunts all multi-dimensional index methods which are based on balanced tree structures. Most of the complexity and ingenuity in their designs is aimed at circumventing or minimising this problem.

When logical region is L is partitioned, the index node which contains the representation of L is modified: the representation of L is replaced by the representation of $L_a$ and $L_b$. There is ab initio no inconsistency within region $L_{ai}$, or within any of the regions which it encloses at lower index levels. It only needs to be split in order to ensure the correct behaviour of the search path through the new index branch created by $L_b$. But there is an alternative strategy: to leave $L_{ai}$ intact, and modify the search path.

Suppose that $L_a$ and $L_b$ contain the sets of logical regions $S_a$ and $S_b$ respectively. If $L_{ai}$ is split into $L'_{ai}$ and $L''_{ai}$ along the boundary of $P_b$, then:

$$L_a = \cup_{u=1}^{n} L_{au} \cup L_{ai}', 1 \leq i \leq n, u \neq i \quad (4)$$

$$L_b = \cup_{v=1}^{m} L_{bv} \cup L_{ai}'', 1 \leq i \leq n \quad (5)$$

But since $L_a \cap L_a'' = \phi$ and $L_b \cap L_{ai}' = \phi$ then:

$$L_a = \cup_{u=1}^{n} L_{au} \cup L_{ai}' \cup L_{ai}'', 1 \leq i \leq n, u \neq i \quad (6)$$

$$= \cup_{u=1}^{n} L_{au} \cup L_{ai}, 1 \leq i \leq n, u \neq i$$

$$L_b = \cup_{v=1}^{m} L_{bv} \cup L_{ai}'' \cup L_{ai}', 1 \leq i \leq n \quad (7)$$

$$= \cup_{v=1}^{m} L_{bv} \cup L_{ai}, 1 \leq i \leq n$$

This shows that, rather than split $L_{ai}$, it can be left intact if the search path can be changed so that $L_{ai}$ is always searched if the search has failed in $L_a$ or $L_b$ respectively. All that is required is that, before an index node is split according to the partitioning algorithm, the node is searched for an entry which represents a partition boundary $P_{ai}$ which directly encloses the splitting boundary $P_b$. If $P_{ai}$ exists, then it is not split, but promoted to the index level above, along with the entries for $P_a$ and $P_b$. The subtree of $P_{ai}$ is automatically promoted with it. A marker is attached to the promoted entry, to distinguish it from an entry created by direct partitioning.

The consequences of this promotion policy on the construction of and access to a BV-tree are developed and demonstrated in the following example.

FIGS. 16a to 16e above show a sequence of partitionings of a data space (left) and the corresponding BV-index structures (right). No assumptions are made about the shape of the data space, or any of the subspaces into which it is partitioned, except that partition boundaries may not be intersect. The data space may finite or infinite.

Figure 16A:
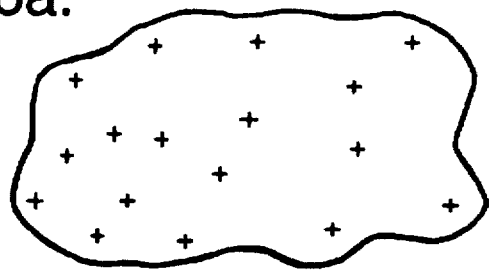
FIGS. 16a–16e show a sequence of partitionings of a data space (left) and the corresponding BV-index structure (right)
Figure 16A:

Initially, there is a single partition region, which is the whole data space. Conceptually, a number of points are inserted into this region (FIG. 16a). (In practice these points are correspond to data records). No assumptions are made about how the points are represented, only that there is a maximum number P which can be inserted into any one partition region.

On the right of FIG. 16a is a data node, which represents the partition region containing the points. (In practice this corresponds to one or more pages of computer memory, in which the records are stored).

When the number of points inserted into a partition region exceeds P, the region must be split into two. It can be shown that it is always possible to replace an overflowing region by two new regions, each of which contains at least ⅓ of the maximum number of points P allowed in a single region.

Figure 16B:
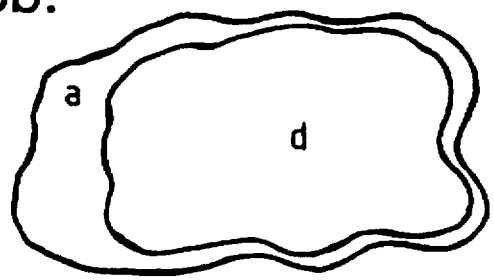
Figure 16B:
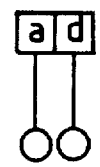

FIG. 16b shows a data space after the first overflow and split. An index node has been created which contains two entries, each of which is a unique key identifying one of the partition regions. Associated with each index node entry is a pointer to the data node which represents the partition region and its enclosed data points. Again, no assumptions are made about the way in which the identifying keys of the partition regions are generated or represented. It is assumed only that there is an upper limit F (the fan-out ratio) to the number of entries which can be recorded in a single index node. The order shown for the index entries has no significance: in practice, the particular order chosen depends on the form of the representation of partition region keys, and the efficiency of operations on this representation. For clarity, the data points themselves are not shown in subsequent figures.

Figure 16C:
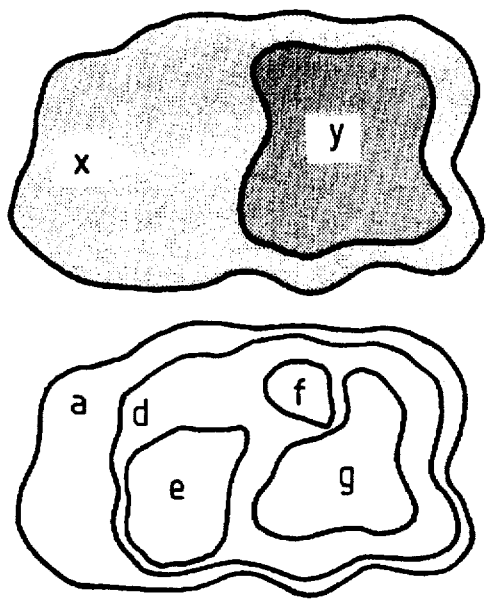
Figure 16C:
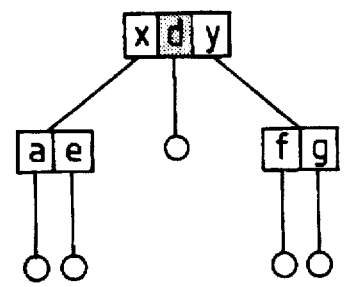

Assume, without loss of generality, that the fan-out ratio F of the index nodes is four. FIG. 16c shows the situation after the creation of three additional partition regions with keys e, f, g. This causes the index node of FIG. 16b to overflow. The regions represented in the node with keys a, d, e, f and g are then partitioned into two regions of regions x and y, which form the root node of a new, two-level index. The left part of FIG. 16c shows the partition regions represented at the upper and lower levels of the index.

The right part of FIG. 16c also shows that the index split has been accompanied by the promotion of entry d to the level above. Whenever the boundary of a split (in this case the boundary of region y) does not coincide with an existing region boundary, but is itself enclosed by one or more region boundaries, then that region whose boundary directly encloses the boundary of the split (in this case region d) is promoted to the index level above. If d is the root of a subtree, then the subtree is automatically promoted with it.

During traversal operations on the tree structure, promoted entries are treated differently from non-promoted entries. Thus promoted entries are marked as such. This marking is indicated in the diagram (FIG. 16c right) by the shading of the entry for region d.

Figure 16D:
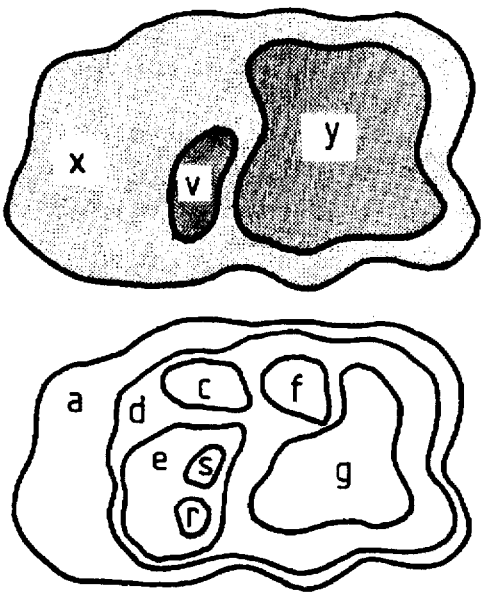
Figure 16D:
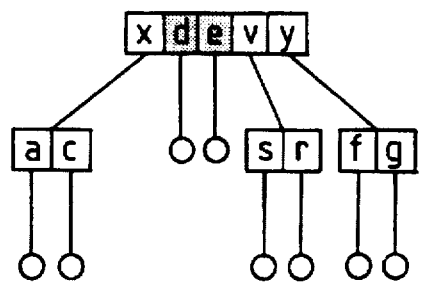

FIG. 16d shows the result of a second overflow and split. Region x has overflowed and split into x and v. This has caused region e—which directly encloses v to be promoted.

Figure 16E:
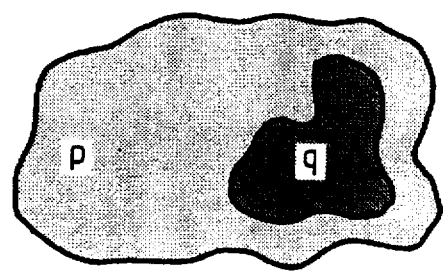
Figure 16E:
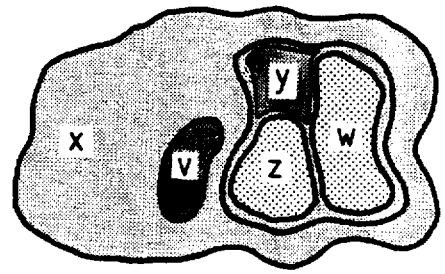
Figure 16E:
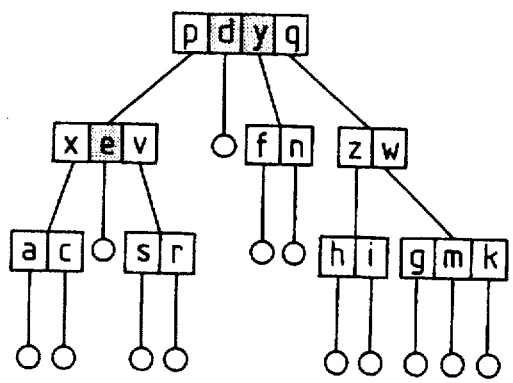
Figure 16E:
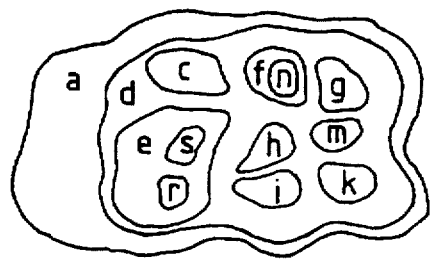

Finally, FIG. 16e shows the result after several further splits, which have finally caused the creation of a third directory level. In particular, the creation of the new root node has been accompanied by the promotion of both d and y from the level below. This illustrates the general rule that, when a region p splits into regions p and q, such that p encloses q, then any entries at the index level below—whether already promoted or unpromoted—which represent regions which directly enclose q, are promoted to the level of the entries for p and q. [NB Two regions a and b can both directly enclose a third if a and b are from different index levels].

A promoted region p in node n can also overflow and split into two regions $p^1$ and $p^{11}$. Both resulting regions are then treated in the same way. Thus if p now represents either $p^1$ or $p^{11}$ then: if p directly encloses an unpromoted region in index node n, then it remains in the node (unless the insertion of an additional entry causes the node to overflow). Otherwise, a search is made within node n for the entry e—of any promoted level lower than that of p, or unpromoted—which directly encloses p. p is then inserted, according to the same algorithm, in the node to which entry e points i.e. if it does not enclose an unpromoted region then it will be further demoted, until it reaches its own original index level.

Figure 16F:
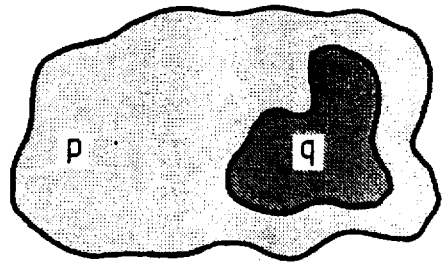
FIG. 16f shows the splitting of a promoted region.
Figure 16F:
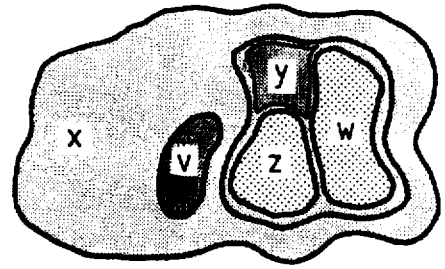
Figure 16F:
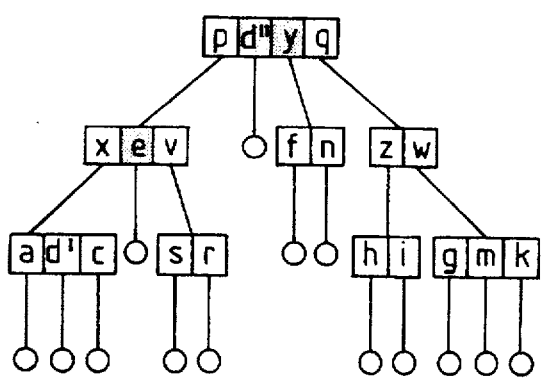
Figure 16F:
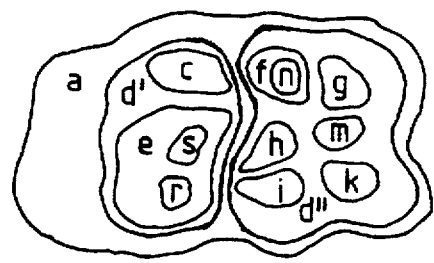

For example, suppose region d in FIG. 16e overflows and splits as shown in FIG. 16f. In the root index node, entry $d^{11}$ directly encloses unpromoted entry q, and so $d^{11}$ is inserted in the root node. $d^1$ encloses no entries in the root node, so an attempt is made to insert it into the node to which p points, since p directly encloses $d^{11}$.

The algorithm is then repeated: $d^1$ encloses v, but not directly, since e encloses v directly. Therefore $d^1$ is inserted in the node to which x points, since x directly enclosed $d^1$. The algorithm now terminates, because the unpromoted level of entry $d^1$ has now been reached.

Now consider an exact-match search. It requires an algorithm which consists of a combination of a forward and backward search of the index tree. The forward search starts at the root of the tree. A search is made in the root node for the smallest region which encloses the specified data point (i.e. matches the search key). If such a region is found, then the associated pointer is followed down to the next level of the index tree, and so on, until a data node is reached. The data node is then searched for a data point which matches the specified data point. It a match is found, the search succeeds. Otherwise it fails. In either case, the search then terminates.

Superimposed on this forward search is a search which backtracks over the forward search path. When a matching entry is found at any index level l during the forward search, the search backtracks to the root, searching at each higher level $i (1 \leq i < L)$ for a promote region from level L which is directly enclosed by the non-promoted matching entry level i, and which is a better match (i.e. smaller region) than any previously found matching region at any level. If no such better match is found during backtracking, the forward search resumes from the point at which the backtrack was initiated i.e. at the node (at level L+1) pointed to by the last non-promoted entry found at level L. Otherwise, the forward search is restarted at the node pointed to by the best-match entry. Note that this node will also be at level L+1.

If the forward search fails at a branch node at level L, then the backward search is again initiated, but this time a search is made at each higher level $i (l < i > L)$ for a promoted region from level L which directly encloses the non-promoted matching entry at level i. The backtrack search halts as soon as the first such matching entry is found, and the forward search resumes at the node to which it points. Again, this node will be at level L+1. If this backtrack search fails to find any matching entry at any level, then it exits from the root and the search fails and terminates.

Two examples of exact-match searching are given in the following.

Figure 17:
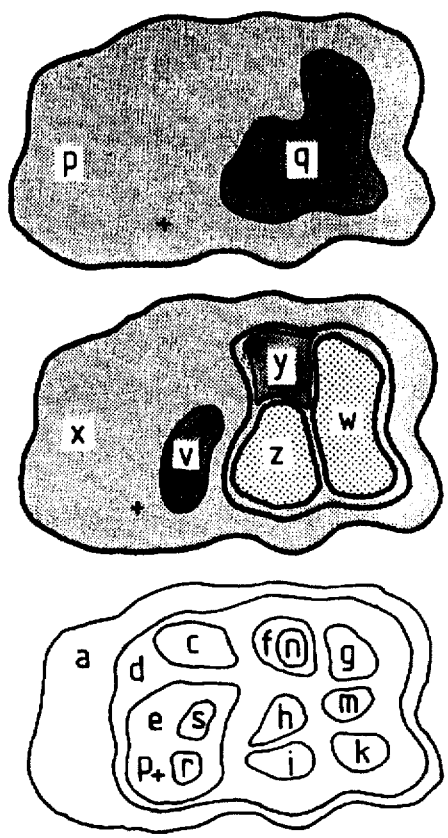
FIGS. 17 and 18 illustrate two examples of exact-match searching.
Figure 17:
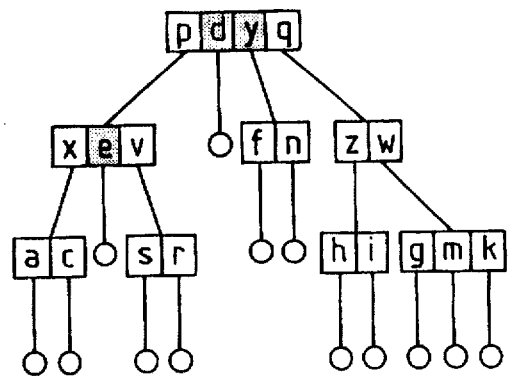

Referring firstly to FIG. 17, suppose that there is a data point located at position P in a data space partitioned by a three-level index as shown in FIG. 17. A search for P then proceeds as follows:

Starting from the root, the key generated from data point P matches entry p—and only entry p—in the root node. The search then follows the pointer associated with entry p down to index level 2. At this level, the search key matches only x.

At this point, the backtrack search is invoked: a search is made at level 1 among the entries promoted from level 2. y is the only candidate in this case. y is directly enclosed by p, but it does not enclose point P. The backtrack therefore fails at this level, and since there are no higher levels, it fails altogether, and the forward search resumes at level 3, at the node pointed to by x.

a is the only matching entry for P at level 3. Backtracking is again invoked: a search is made at level 2 among the entries promoted from level 3. e is the only candidate. It is directly enclosed by x, it encloses P, and it is smaller than a—the previous best match. e thus becomes the current best-match. Backtracking however continues. At level 1, d is the only candidate. But since it is not smaller than e, e remains the best match. Having reached the root, the backtrack search stops and the forward search resumes at the node pointed to be e. This is a data node, and so the search succeeds when the point P is found in this node.

Figure 18:
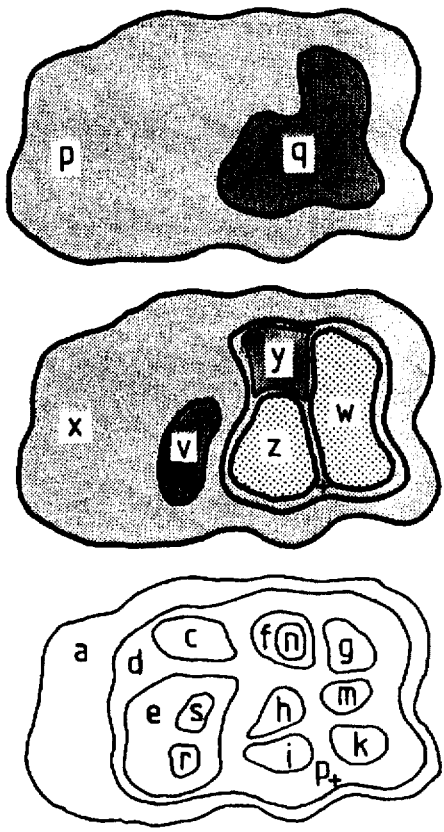
Figure 18:
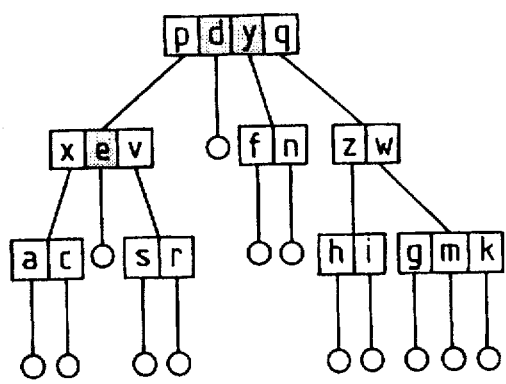

Referring now to FIG. 18, suppose point P is now located as shown in FIG. 18. The search for P proceeds as follows:

Starting from the root, the key matches entry q. But at level 2 the search fails, because P does not lie in either z or w. This causes backtracking to be invoked. At level 1, y is the only candidate entry promoted from level 2. It also directly encloses q, the matching unpromoted entry in level 1. The backtracking thus halts, and y becomes the new starting point for the forward search. But the search fails again at level 3, since P does not lie in either f or n. Backtracking is thus again invoked. At level 1, d is the only candidate entry promoted from level 3. It directly encloses q, and it encloses P. Backtracking again halts, and the forward search continues from d. Since the node pointed to d, is a data node, the search succeeds when the point P is found in this node.

There is a price to be paid for this solution: the index tree is no longer balanced. At first sight, this violates the most sacred principle of hierarchical indexing: without a fixed length search path from root to leaf, the worst-case behaviour for exact-match queries becomes uncontrollable. However, what is really important is not so much the path length as the number of different tree branch nodes traversed. These two will be different if a search path involves back-tracking. The total path length must have a predictable upper limit, but it is a reasonable practical assumption that, with standard caching techniques, there will be no extra retrieval cost in re-visiting a node which lies along the direct path from root to leaf.

Consider the downward and upward parts of as exact-match search path, according to the search algorithm described above. A downward search will fail if the target location lies within a promoted logical region, and the failure will occur at the level from which the region was originally promoted. But the sum of all the nodes visited during the downward traversal phases of an exact-match search will remain constant for a given tree size. Likewise, although a promoted subtree may be further promoted to any higher level in the tree, and a subtree of a subtree may also be promoted, the total height through which promotion of any logical region can occur cannot be greater than the height of the tree. Therefore, the number of different branch nodes visited in an exact-match search is always equal to the height of the tree.

If any subtree could be arbitrarily promoted to a high level, a crucially important property of a balanced tree structure would be lost: the logarithmic relationship between the number of data nodes and the path length from root to leaf of the index. This relationship first of all requires that the direct path length from root to leaf is fixed, for a given state of the index tree i.e. that the tree is perfectly balanced. It also requires that the fan-out ratio in every index node (except the root) must never fall below a fixed minimum (which must be at least an order of magnitude greater than 1). The linear relationship between the number of index nodes and the number of data nodes is a further consequence of these requirements.

However, the promotion of a subtree only occurs under the circumstances described above, and only when an index node overflows and splits. Therefore, since every index node except the first is created by splitting, there can never be, overall, more promoted index entries than unpromoted entries, unless through the splitting of an entry which is already promoted, since this will create a second entry at the same (promoted) level.

It could also cause a further promotion from the level below. Fortunately, it can be proved that it is always possible in such cases to return all but one of the entries resulting from such a split to their originating (unpromoted) positions in the index tree. It is also possible to prove that this requires no more node accesses than would have been necessary if the entries had not been promoted i.e. if the tree had been balanced.

This does not however means that there are never more promoted entries than unpromoted entries in an index node. It was explained above that, when a region p splits into regions p and q, such that p encloses q, then any entries at the index level below—whether already promoted or unpromoted—which represent regions which directly enclose q, are promoted to the level of the entries for p and q. This effect can thus become cumulative as entries are promoted up the index tree. In general, the maximum possible number of promoted entries in a node at level L of an index tree of maximum depth d is n(d−L), where n is the number of unpromoted entries in the node.

So, in order to guarantee that the exact-match search path from root to leaf in the BV-tree will be no longer than that of a balanced tree with the same number of data nodes, the index nodes at level L of a BV-tree need to be increased in size by a factor of (d−L+1). (Note however that the occupancy of the index nodes will still not fall below ⅓). It may well not be considered worthwhile to make allowance for this effect in practice. But at least it is possible to do so in a controlled manner, with predictable consequences, if necessary.

This is the only price which has to be paid for obtaining the characteristics of the B-tree in n-dimensions. The worst-case index node occupancy is only ⅓, compared to ½ for the B-tree. But this is a consequence of topological considerations, rather than a limitation of a particular index design. More important is that this occupancy level is guaranteed for every index node under all circumstances, thus guaranteeing a minimum occupancy for the entire index. The worst-case occupancy of a data node remains at 1/2 in the n-dimensional case, provided that for any given attribute of a tuple, no two tuples have the same attribute value. Otherwise, the worst case occupancy falls to ⅓.

The BV-tree (hierarchical index of memory pages) presented above organises the contents of the memory pages, and the access paths between them, in such a way that the following properties are satisfied and guaranteed under all circumstances.

1. each page corresponds to a representation of a unique subspace of the data space;
2. the time taken to access the page which holds the data representing a single, specified point in the corresponding data space depends only on the total number of pages used to represent the whole space, and increases only logarithmically with this number. In particular, the time is independent of the point chosen;
3. the data occupancy of every page never falls below a fixed and acceptable minimum (⅓);
4. the distribution of points in the data space is reflected closely in the distribution of the data in the memory pages i.e. adjacent points in the data space are represented within a single memory page, as far as possible;
5. the time taken to insert, delete or modify a specified point in the data space in the corresponding memory pages depends logarithmically on the total number of pages;
6. the performance of access, insertion, deletion and modification operations does not degrade as a consequence of the passage of time and/or degree of usage.

The BV-tree represents the recursive partitioning of the data space into a hierarchy of subspaces. A feature of the BV-tree is that some entries in the index tree can be "promoted" to a higher level of the tree, so that the length of a direct path from top to bottom of the tree is not necessarily independent of the path chosen. Nevertheless, the number of different nodes of the index hierarchy which are visited along the search path for an individual point in the data space is always constant, for a constant total number of points.

In order to be able to detect which index entries have been promoted in this way, each index entry is "labelled" with its "level number". This is the level of the index tree at which the entry was "created". Since an expanding tree grows by splitting the root, the entries in the lowest (inverted) tree nodes are labelled level 1, and the entries in the root node have the highest level so far created.

In essence, the search algorithm to find a point in the index is unchanged from the classical exact-match tree search, as in the B-tree. A search is made iteratively at each level of the hierarchy, from the root downwards, for the "smallest" partition in which the point lies. The critical difference from every other such design in that the index "tree" no longer directly corresponds to the index "hierarchy".

In FIG. 17, for example, only those entries labelled as level 3 of the index hierarchy are initially examined at the top level of the index tree. In this example these are entries p and q. Entries d (level 1) and y (level 2 ) are ignored. Suppose a match is found with entry p. The search then iterates to the next lower hierarchical level. The entries at the next lower "hierarchical" level are x, v and y. That is all the entries traversed so far which are labelled level 2, despite the fact that they are not all at the same index "tree" level. The problem involved with splitting y is avoided by not splitting y. Instead y is included in the search, whichever side of the index tree the search descends. The fact that d has actually been promoted through the levels in FIG. 17 is a consequence of recursively applying the idea to the whole index. If, for example, the target point lies in partition v at hierarchical level 2, then the partitions searched at level 1 are s, r, e and d, i.e. all of the entries of level 1 in the nodes traversed during descent of the index tree. It should be noted that if a match is found with partition v, it will also match partition x which encloses v. This ambiguity is resolved, however, because the "smallest" matching entry in the index is the one taken i.e. the most deeply nested one.

The solution to the multidimensional problem, with which the invention is concerned, provided by the BV-tree is a surprising one. It had always been assumed that the index tree must be exactly balanced i.e. that the direct path from root to leaf must be the same for all possible paths. This was to ensure that the number of tree nodes visited was the same for all direct paths. It was always assumed that the two things automatically went together. The BV-tree shows that they do not. It does not matter how unbalanced the tree structure is, if the search path up and down the tree is so arranged that the number of different nodes visited is always the same.

The positions of the partitions, their shapes and the way in which they are represented does not affect the principle of the invention in any way. The only restrictions on the partitions are given by axioms 1 and 2. These axioms apply to all the partitions in the index, taken together, whatever level of the hierarchy they may belong to. The strange-shaped partitions of FIG. 16 were deliberately chosen to emphasise the above. Usually, index designs do not distinguish between the "principles" of the design and a specific "implementation" of it. This is usually because the design is heavily implementation dependent. In practice partition shapes like those in FIG. 16 are impractical because it is difficult to find a compact and precise representation of such shapes. Hence rectangular boxes are usually chosen. These can be represented in many ways. The most obvious is by specifying the coordinates of the bottom left-hand and upper right-hand corners. This way a box of any size and rectangular shape can be represented. An alternative representation is shown in FIGS. 1-4. The data space there is partitioned by progressively dividing it up precisely in half in alternate dimensions (binary division). This generates a unique binary identifier for each partition as shown.

For the sake of completeness the differences between the BANG file and the BV-tree will now be repeated. It should be understood, however, that the invention is not simply an extension of the BANG file. The feature of promoting index entries upon partition splitting is equally applicable to other indexes, with corresponding beneficial effects.

In principle the index hierarchy is the same for both the BANG file and the BV-tree. The index tree is, however, different. The binary partitions of the data space used in the BANG file, and the BANG file's representation of these binary partitions as variable-length strings, could also be used in one possible representation of the BV-tree. As is apparent from the foregoing the partitioning does not have to be binary, as evidenced by the strange-shaped partitions of FIG. 16 etc. The BV-tree can also be described, for example, in terms of a range-based representation in which the partitions are described by an arbitrary sequence of divisions at any point in the range of a dimension of the data space. There are many possibilities. The binary domain-based partition representation of the BANG file is not the only way of representing a BV-tree.

The iterative exact-match index search algorithm down the tree is also essentially the same in the BANG file and the BV-tree. The basic difference is that the index entries of a hierarchical level L in the BANG file are all stored at level L in the tree, whereas in the BV-tree some entries of hierarchical level L may appear at index tree levels higher than L.

In the BANG file every exact-match search follows the shortest path from the root to one of the leaves of the index tree. The number of tree nodes visited is the same for all such paths, and is equal to the number of levels in the tree hierarchy, i.e. the height of the tree, which is fully balanced. In the BV-tree, however, every exact-match search visits the same number of different tree nodes, and this number is equal to the longest direct path from root to leaf of the index tree, the maximum height of the tree being h.

In the BANG file and the BV-tree, it is always possible to split an overflowing partition, at any index tree level, so that each of the resulting partitions contains at least one third of the contents (data or partitions) of the original partition. However, in the BANG file it is not in general possible to do this without also splitting at least one other partition at the lower index level, and in this case it is not in general possible to maintain the above splitting balance. The BV-tree avoids this problem by promoting partitions.

The BV-tree provides the following advantages:

1. In circumstances where the pattern of (relational) database queries is unpredictable, the average response time can be an order of magnitude faster than with a conventional 1-dimensional index. (The n-dimensional index can still be used as a 1-dimensional index where there is a fixed query pattern).

2. It allows n-dimensional indexing in $0(n/B)$, exact-match query I/O time $0(\log n \text{ base } B)$ and worst-case update time $0(\log n \text{ base } B)$, where n is the total number of indexed data points and B is the maximum number of index entries per page.

Figure 19:
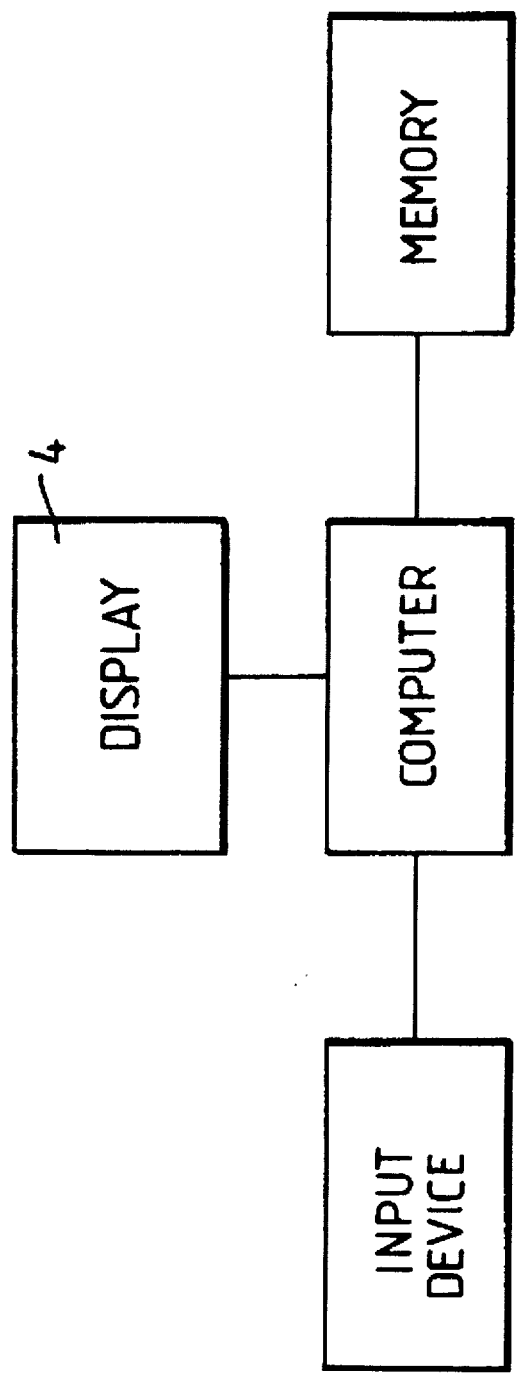
FIG. 19 illustrates, schematically, a computer system.

The hierarchical index structure, database structure, indexing and searching techniques described above are capable of being used in any computer system including a memory, in particular a one-dimensional memory, i.e. a memory consisting of a linear sequence of pages. The computer system may be as illustrated schematically in FIG. 19, which comprises a computer (processor) 1, with a memory device 2, an input device 3 and a display device 4.

I claim:

1. A computer-implemented computer data storage management system including a memory employing a hierarchical data structure representing the recursive partitioning of a data space into contiguous or disjoint subspaces, and such that the external boundary of any subspace does not intersect the external or internal boundary of any other subspace at the same or any other level of recursive partitioning but may enclose, or partially coincide with, the external boundary of said other subspace;

the data structure hierarchy comprising a plurality of nodes including a root node, a plurality of branch nodes and a plurality of leaf nodes;

each node in the data structure hierarchy representing a subspace at respective or lower level in the corresponding recursive partition hierarchy;

the root node representing the entire data space;

each lower level node representing a subspace of the space represented by a respective parent node, or a subspace of the space represented by a descendant of the respective parent node, each lower level node comprising a child node;

the branch nodes in the hierarchical data structure being index nodes and the leaf nodes being data nodes;

each data node containing either a set of data entries or a set of pointers which reference data entries stored elsewhere;

each data entry containing a value or set of values which directly or indirectly specify the coordinates of a point representing that data entry in the data space;

each index node containing a set of index entries;

each index entry corresponding uniquely to one of the children of the index node which contains the index entry, each index entry being associated with:

(i) a respective pointer which refers to the logical address of the child node corresponding to the index entry, and (ii) a value or set of values which directly or indirectly defines the external boundary of the subspace represented by the index entry; characterised in that:

node promotion can occur as a result of node overflows due to the introduction of extra information into the memory;

an unpromoted node being a node which is at the same level in the data structure hierarchy as the level of the subspace which it represents in the corresponding recursive partition hierarchy, and a promoted node being a node which is at a higher level in the data structure hierarchy than the level of the subspace which it represents in the corresponding recursive partition hierarchy;

the subspace represented by any child node promoted to a respective node being a subspace of the union of all the subspaces represented by unpromoted children of the respective node;

in that the system includes first means which, upon the introduction of said extra information into the memory and resultant overflow of an index node, split the said index node into two resulting index nodes by partitioning the space which the said index node represents into two subspaces, said partitioning either being such that the number of index entries in the two resulting index nodes is as near equal as possible, or being in accordance with a predetermined criterion of balance in the distribution of the index entries between the two resulting index nodes; the first means serving also to dispose the two resulting index nodes at the same level of the data structure hierarchy as the index node from which they were created, with each resulting index node having as parent the parent of the index node from which it was created, in that the system includes second means which, if the external boundary of one of the two subspaces represented by the resulting index nodes is enclosed by the external boundary of the other of the two subspaces, and if no index entry in the said index node represents a subspace whose external boundary coincides with the said enclosed external boundary but there exists in the said index node an unpromoted or promoted index entry which represents a subspace whose external boundary directly encloses the said enclosed external boundary, promote said unpromoted or promoted index entry to the parent of the said index node; the external boundary of a first subspace directly enclosing the external boundary of a second subspace if, at the same recursive partition level, there exists no third subspace whose external boundary is enclosed by the external boundary of the said first subspace and whose external boundary encloses the external boundary of the said second subspace;

in that the system includes third means which for each index node entry associate an indication of the level, in the hierarchy of recursive partitions of the dataspace, of the subspace represented by the entry;

and characterised in that the internal boundary of the subspace represented by an index entry is defined implicitly by the presence in the index of one or more other index entries which belong to the same or higher recursive partitioning level and each of which represents a subspace which the external boundary of the subspace represented by the said index entry directly encloses.

2. A computer implemented method for use in indexing a data space, the data space comprising a database for multi-dimensional information, the indexing having a hierarchical structure and the dataspace being recursively partitioned into subspaces with the corresponding index entry nodes arranged in an index tree, characterised in that the method comprises a plurality of steps including, upon the introduction of extra information causing an index entry node to overflow, the step of splitting the said index entry node into two resulting index nodes by partitioning the space which the said index node represents into two subspaces, said partitioning either being such that the number of index entries in the two resulting index nodes is as near equal as possible, or being in accordance with a predetermined criterion of balance in the distribution of the index entries between the two resulting index nodes;

the step of disposing the two resulting index nodes at the same level of the index tree as the index node from which they were created, with each resulting index node having as parent the parent of the said index node from which it was created;

if the external boundary of one of the two subspaces represented by the resulting index nodes is enclosed by the external boundary of the other of the two subspaces, and if no index entry in the said index node represents a subspace whose external boundary coincides with the said enclosed external boundary but there exists in the said index node an unpromoted or promoted index entry which represents a subspace whose external boundary directly encloses the said enclosed external boundary, the step of promoting said unpromoted or promoted index entry to the parent of the said index node; an unpromoted index entry being an index entry which is at the same level in the data structure hierarchy as the level of the subspace which it represents in the corresponding recursive partition hierarchy, and a promoted index entry being an index entry which is at a higher level in the data structure hierarchy than the level of the subspace which it represents in the corresponding recursive partition hierarchy, and the external boundary of a first subspace directly enclosing the external boundary of a second subspace if, at the same recursive partition level, there exists no third subspace whose external boundary is enclosed by the external boundary of said first subspace and whose external boundary encloses the external boundary of the second subspace, and including the step of labelling each newly created index entry with the level of the subspace which it represents in the recursive partition hierarchy, whereby to facilitate the detection of index entries disposed at higher levels in the index tree than the level in the recursive partition hierarchy to which they correspond.

3. A computer-implemented method of searching a computer memory having a hierarchical data structure which represents the recursive partitioning of a data space of a plurality of dimensions into contiguous or disjoint subspaces, and which is such that the external boundary of any subspace does not intersect the external or internal boundary of any other subspace at the same or any other level of recursive partitioning but may enclose, or partially coincide with, the external boundary of such other subspace, the data structure hierarchy comprising a plurality of nodes including a root node, a plurality of branch nodes and a plurality of leaf nodes in a tree structure;

each node in the data structure hierarchy representing a subspace at a respective or lower level in the corresponding recursive partition hierarchy;

the root node representing the entire data space;

each lower level node representing a subspace of the space represented by a respective parent node, or a subspace of the space represented by a descendant of the respective parent node, each lower level node comprising a child node; an unpromoted node being a node which is at the same level in the data structure hierarchy as the level of the subspace which it represents in the corresponding recursive partition hierarchy, and a promoted node being a node which is at a higher level in the data structure hierarchy than the level of the subspace which it represents in the recursive partition hierarchy, promotion occurring as a result of node overflows due to the introduction of extra information into the memory;

the subspace represented by any child node promoted to a respective node being a subspace of the union of all of the subspaces represented by unpromoted children of the respective node;

the branch nodes in the hierarchical data structure being index nodes and the leaf nodes being data nodes;

each data node containing either a set of data entries or a set of pointers which reference data entries stored elsewhere; each data entry containing a value or set of values which directly or indirectly specify the coordinates of a point representing that data entry in the data space;

each index node containing a set of index entries; wherein
(i) upon the introduction of said extra information into the memory and resultant overflow of an index entry node, the said index entry node is split into two resulting index nodes by partitioning the space which the said index node represents into two subspaces, said partitioning either being such that the number of index entries in the two resulting index nodes is as near equal as possible, or being in accordance with a predetermined criterion of balance in the distribution of the index entries between the two resulting index nodes; the two resulting index nodes being disposed at the same level of the data structure hierarchy as the index node from which they were created, and each resulting index node having as parent the parent of the index node from which it was created, and (ii) if the external boundary of one of the two subspaces represented by the resulting index nodes is enclosed by the external boundary of the other of the two subspaces, and if no index entry in the said index node represents a subspace whose external boundary coincides with the said enclosed external boundary but there exists in the said index node an unpromoted or promoted index entry which represents a subspace whose external boundary directly encloses the said enclosed external boundary, then said unpromoted or promoted index entry is promoted to the parent of the said index node;

each index entry corresponding uniquely to one of the children of the index node which contains the index entry, each index entry being associated with:

(i) a respective pointer which refers to the logical address of the child node corresponding to the index entry;

(ii) an indication of the level, in the hierarchy of recursive partitions of the data space, of the subspace represented by the entry, and (iii) a value or a set of values which directly or indirectly defines the external boundary of the subspace represented by the index entry;

and the internal boundary of the subspace represented by an index entry being defined implicitly by the presence in the index of one or more other index entries which belong to the same or higher recursive partitioning levels and each of which represents a subspace which the external boundary of the subspace represented by the said index entry directly encloses;

the external boundary of a first subspace directly enclosing the external boundary of a second subspace if, at the same recursive partition level, there exists no third subspace whose external boundary is enclosed by the external boundary of the said first subspace and whose external boundary encloses the external boundary of the said second subspace;

and the method comprising a plurality of steps for searching iteratively the recursive partition hierarchy for the smallest subspace which encloses a point in the data space, such point representing the sought item of information;

said search comprising the step of iteratively reconstituting the relevant nodes in the recursive partition hierarchy from the corresponding index hierarchy during the search;

starting at the root node of the index tree, the step of searching the unpromoted index entries in the index node for an unpromoted index entry which represents a subspace which directly encloses the point representing the sought item of information;

in the case of no such unpromoted index entry being found in the index node the search failing and terminating;

in the case of such an unpromoted index entry being found, the step of searching promoted index entries in the index node for those promoted index entries which respectively represent a subspace which directly encloses the point representing the sought item of information;

and the steps of copying each such promoted index entry directly enclosing the point representing the sought item of information, carrying it forward, demoting it by one level and including it for the purpose of the search only with the set of index entries in the next indexed node to be searched;

the next index node to be searched being that index node referenced by the pointer associated with the unpromoted index entry which represents a subspace which directly encloses the point representing the sought item of information;

the number of different index nodes visited along the search path for the item of information being sought being constant for a constant total number of items of information contained in the data space.

* * * * *